United States Patent
Curtin et al.

(10) Patent No.: US 10,249,423 B2
(45) Date of Patent: Apr. 2, 2019

(54) FLUID RESISTANT SOLENOID AND RELATED METHOD

(71) Applicant: Norgren, Inc., Littleton, CO (US)

(72) Inventors: Kevin Curtin, West Hartford, CT (US); Darrick Chekas, Farmington, CT (US); Frank D Laudato, Farmington, CT (US)

(73) Assignee: Norgren, Inc., Littleton, CO (US)

(*) Notice: Subject to any disclaimer, the term of this patent is extended or adjusted under 35 U.S.C. 154(b) by 6 days.

(21) Appl. No.: 15/506,615

(22) PCT Filed: Sep. 1, 2015

(86) PCT No.: PCT/US2015/047913
§ 371 (c)(1),
(2) Date: Feb. 24, 2017

(87) PCT Pub. No.: WO2016/040050
PCT Pub. Date: Mar. 17, 2016

(65) Prior Publication Data
US 2017/0250020 A1 Aug. 31, 2017

Related U.S. Application Data

(60) Provisional application No. 62/048,872, filed on Sep. 11, 2014.

(51) Int. Cl.
*F16K 27/02* (2006.01)
*H01F 7/121* (2006.01)
(Continued)

(52) U.S. Cl.
CPC ............ *H01F 7/126* (2013.01); *F16K 27/029* (2013.01); *F16K 31/0675* (2013.01);
(Continued)

(58) Field of Classification Search
CPC ......... Y10T 137/0491; Y10T 137/5987; F16B 35/042; F16B 35/044; F16B 35/045;
(Continued)

(56) References Cited

U.S. PATENT DOCUMENTS 4,114,670 A * 9/1978 Akashi ............... F16B 33/002
29/509
4,356,832 A * 11/1982 Velan ................. F16K 41/00
137/15.18

(Continued)

FOREIGN PATENT DOCUMENTS

EP 2281445 A2 2/2011
JP 2000042180 A 2/2000
(Continued)

*Primary Examiner* — Matthew W Jellett
(74) *Attorney, Agent, or Firm* — The Ollila Law Group LLC

(57) ABSTRACT

A solenoid assembly (100) is provided that includes a frame (104), a coil (106) positioned proximate the frame (104), and a core (114) defined by the coil (106). A plunger (108) is actuatable between at least a first position and a second position, and a guide (109) is at least partially disposed within the core (114). The plunger (108) is disposed at least partially within the guide (109). A housing (102) at least partially houses the frame (104), the coil (106), the guide (109) and the plunger (108), and the guide (109) is prevented from rotating independently of the housing (102).

25 Claims, 7 Drawing Sheets

(51) Int. Cl.
*F16K 31/06* (2006.01)
*H01F 7/126* (2006.01)
*H01F 7/127* (2006.01)
*H01F 7/16* (2006.01)
*F16K 27/08* (2006.01)
*F16B 35/04* (2006.01)

(52) U.S. Cl.
CPC .............. *H01F 7/121* (2013.01); *H01F 7/127* (2013.01); *H01F 7/1607* (2013.01); *F16B 35/041* (2013.01); *F16B 35/042* (2013.01); *F16K 27/08* (2013.01); *Y10T 137/0491* (2015.04); *Y10T 137/598* (2015.04); *Y10T 137/5987* (2015.04)

(58) Field of Classification Search
CPC ...... F16B 35/048; F16K 27/029; F16K 27/08; F16K 31/0675; H01F 7/121; H01F 7/126; H01F 7/127; H01F 7/1607
See application file for complete search history.

(56) References Cited

U.S. PATENT DOCUMENTS

| | | | |
|---|---|---|---|
| 5,234,236 A * | 8/1993 | Gromotka | E05B 63/0056 292/194 |
| 6,227,223 B1 * | 5/2001 | Crochet | F16K 27/07 105/377.07 |
| 8,851,447 B2 * | 10/2014 | Crist | A01G 25/16 251/129.04 |
| 2006/0038645 A1 | 2/2006 | Hoffman | |
| 2010/0082169 A1 * | 4/2010 | Crist | A01G 25/16 700/284 |
| 2012/0112860 A1 | 5/2012 | Gruden | |
| 2013/0009081 A1 | 1/2013 | Karl et al. | |
| 2013/0234816 A1 | 9/2013 | Grunschlag et al. | |

FOREIGN PATENT DOCUMENTS

| | | |
|---|---|---|
| KR | 20130134027 A | 12/2013 |
| WO | WO0106158 A1 | 1/2001 |

* cited by examiner

FLUID RESISTANT SOLENOID AND RELATED METHOD

FIELD OF THE INVENTION

The embodiments described below relate to solenoids, and more particularly, to an improved user-serviceable water resistant solenoid and related method.

BACKGROUND

Electromagnet switching devices such as solenoids are used in any number of applications, ranging from automotive engines and industrial valve systems, to generators and consumer products. Solenoids are typically electromechanical devices that convert an electrical energy input into to a linear mechanical motion output. Solenoids typically have an inductive electromagnetic coil that is wound in such a manner to define a hollow core portion wherein a metal plunger or armature is situated. The coil is typically wound around a plastic bobbin or other non-magnetic material formed into a bobbin. When a current is applied to the coil, the winding creates a magnetic field which acts upon the plunger, causing the plunger to reciprocate between a first and second position. In most instances, the magnetic field draws the plunger inward to a retracted or energized position towards a stop that limits its travel. The plunger provides the linear mechanical force that is employed to move an external load a predetermined distance. Solenoids are generally constructed having either a single coil or dual coils. The coils are typically copper, but other materials may also be utilized.

Although the forces generated by the coil are relatively weak over long distances, they are often adequate or even considered strong over short distances. They do, however, typically exhibit excellent speed and reaction time. Pneumatic valves or mechanical linkages, as non-limiting examples, are prime candidates for mechanical devices that utilize the linear motion produced by solenoids.

As is well known in the art, the force applied to the plunger is proportional to the change in inductance of the coil with respect to the change in position of the armature, and the current flowing through the coil. This is illustrated by Equation (1), which indicates, as a merely illustrative example, that a change in magnetic flux/unit time through a coil of wire induces an EMF in the wire:

$$\varepsilon = -N \frac{d\Phi}{dt} \quad (1)$$

Where:
ε=induced EMF;
N=number of turns in the coil; and
Φ=magnetic flux.

When a single coil solenoid is energized, the current induced must create a magnetic field that is sufficient to not only actuate the plunger, but also to maintain the plunger in an energized position.

As noted, there are a number of applications for electrically actuated solenoids, many of which subject the units to hostile environments. For example automotive, marine, and numerous industrial applications subject solenoids to particulate matter, large temperature swings, and moisture. As moisture is particularly damaging for the electrical components found in a solenoid, water resistant solenoids have been developed to cope with such environments. In one prior art example, coil components are completely encapsulated in a potting, such as epoxy, thermo-setting plastics, or silicone rubbers. Unfortunately, by completely coating internal electrical components with potting, access to internals is compromised, such that it is not possible to insert tools into the solenoid during servicing. This is a significant drawback of water resistant solenoids, as the hostile environment in which they are deployed necessitates servicing at regular intervals. If openings in the solenoid outer housing that allow tools access to inner components are present, this provides yet another potential route for fluids to compromise the integrity of the device.

Therefore, there is a need for a solenoid having an improved construction such that solenoid service is easily facilitated, yet environmental sealing is not compromised. There is a need for a solenoid that can be easily assembled and disassembled at its service location without the risk of harming relatively delicate internal components or destroying its environmental integrity. Concomitantly, there is a need for a method of servicing a solenoid wherein environmental sealing is not compromised. There is additionally a need for a method to easily service a solenoid without the risk of harming relatively delicate internal components. The embodiments described below overcome these and other problems and an advance in the art is achieved. The embodiments described below provide an apparatus and method relating to a solenoid having an improved connection between an external housing and internal solenoid components, thus allowing a user to apply external forces to the housing, for assembly and disassembly purposes, without damaging the internal structures or compromising the solenoid's environmental integrity.

SUMMARY OF THE INVENTION

A solenoid assembly is provided according to an embodiment. According to an embodiment, the solenoid assembly comprises a frame, a coil is positioned proximate the frame, a core is defined by the coil, and a plunger is actuatable between at least a first position and a second position. A guide is at least partially disposed within the core, wherein the plunger is disposed at least partially within the guide. A housing at least partially houses the frame, the coil, the guide, and the plunger, and the guide is prevented from rotating independently of the housing.

A method of manufacturing a solenoid assembly having a housing that at least partially houses a coil, a frame, a guide, and a plunger is provided according to an embodiment. The embodiment comprises the step of placing the guide in the housing, wherein the guide is prevented from rotating independently of the housing.

A method of disassembling a solenoid assembly is provided according to an embodiment. The embodiment comprises the steps of: applying a torque to a housing; transferring the torque from the housing to a guide disposed at least partially in the housing, wherein the guide and housing are configured to rotate coincidentally; and removing at least one structure from the housing without compromising an encapsulation of the housing.

ASPECTS

According to an aspect a solenoid assembly comprises: a frame; a coil positioned proximate the frame; a core defined by the coil; a plunger actuatable between at least a first position and a second position; a guide at least partially disposed within the core, wherein the plunger is disposed at least partially within the guide; and a housing that at least partially houses the frame, the coil, the guide and the plunger, wherein the guide is prevented from rotating independently of the housing.

Preferably, the plunger is operable with a valve body and configured to control a fluid flow.

Preferably, the frame is prevented from rotating independently of the housing.

Preferably, the solenoid assembly comprises: a stop defined by the frame; and a detent within the housing configured to contact the stop, wherein the detent is configured to prevent the frame from rotating independently of the housing.

Preferably, the housing is shaped to trap at least a portion of the frame to prevent independent rotation of the frame.

Preferably, the detent is defined by the housing.

Preferably, the guide is prevented from rotating independently of the frame.

Preferably, the solenoid assembly comprises: a mating portion defined by the guide; and an aperture defined by the frame, wherein the aperture is configured to receive the mating portion and is configured to prevent the guide from independently rotating within the aperture.

Preferably, the frame defines at least a portion of a flux path.

Preferably, the solenoid assembly comprises: a potting disposed inside the housing that encapsulates at least a portion of structures disposed within the housing.

Preferably, the potting is an epoxy.

Preferably, the guide is prevented from rotating independently of the coil.

Preferably, the solenoid assembly comprises: a mating portion defined by the guide; and an aperture defined by the coil, wherein the aperture is configured to receive the mating portion and is configured to prevent the guide from independently rotating within the aperture.

According to an aspect a method of manufacturing a solenoid assembly having a housing that at least partially houses a coil, a frame, a guide, and a plunger, comprises the step of placing the guide in the housing, wherein the guide is prevented from rotating independently of the housing.

Preferably, the method comprises the step of placing the frame in the housing, wherein the frame is prevented from rotating independently of the housing.

Preferably, the method comprises the step of providing a detent in a cavity defined by the housing that is configured to contact a stop on the frame, wherein the detent prevents the frame from rotating independently of the housing.

Preferably, the step of providing a detent comprises the step of forming the detent with the housing.

Preferably, the method comprises the steps of: providing an aperture defined by the frame; and placing the guide through the aperture of the frame, wherein the guide is prevented from rotating independently of the frame.

Preferably, the step of placing a guide through an aperture of the frame comprises the step of providing a mating portion on the guide.

Preferably, the method comprises the step of placing a potting in the housing.

Preferably, the method comprises the steps of: providing an aperture defined by the coil; and placing the guide through an aperture of the coil, wherein the guide is prevented from rotating independently of the coil.

Preferably, the step of placing a guide through an aperture of the coil comprises the step of providing a mating portion on the guide.

According to an aspect a method of disassembling a solenoid assembly comprises the steps of: applying a torque to a housing; transferring the torque from the housing to a guide disposed at least partially in the housing, wherein the guide and housing are configured to rotate coincidentally; and removing at least one structure from within the housing without compromising an encapsulation of the housing.

Preferably, the method comprises the step of transferring the torque from the housing to a frame disposed at least partially within the housing, wherein the frame and housing are configured to rotate coincidentally.

Preferably, the method comprises the step of transferring the torque from the frame to a coil disposed at least partially within the housing, wherein the frame and coil are configured to rotate coincidentally.

Preferably, the method comprises the step of transferring the torque from the frame to the guide, wherein the frame and guide are configured to rotate coincidentally.

Preferably, the method comprises the step of transferring the torque from the housing to a coil disposed at least partially within the housing, wherein the housing and coil are configured to rotate coincidentally Preferably, the method comprises the step of transferring the torque from the coil disposed at least partially in the housing to the guide, wherein the coil and guide are configured to rotate coincidentally.

Preferably, the method comprises the step of providing a potting within the housing to form the encapsulation.

BRIEF DESCRIPTION OF THE DRAWINGS

The same reference number represents the same element on all drawings. The drawings are not necessarily to scale.

DETAILED DESCRIPTION OF THE INVENTION

FIGS. 1-7 and the following description depict specific examples to teach those skilled in the art how to make and use the best mode of embodiments of a solenoid and related methods. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
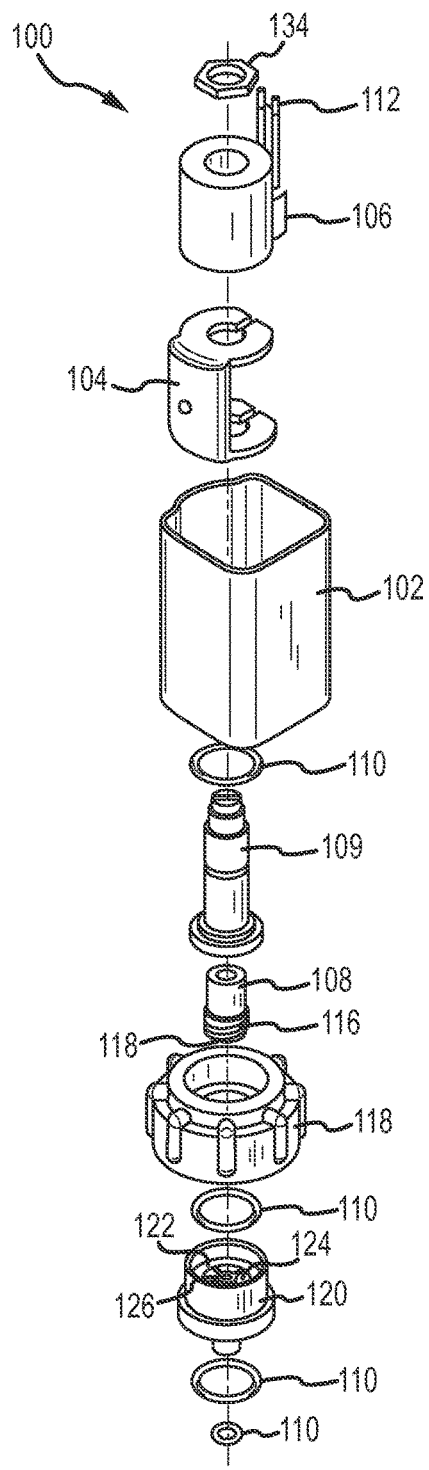
FIG. 1 illustrates an exploded view of a prior art solenoid assembly.

FIG. 1 illustrates an exploded view of a prior art solenoid assembly 100. The solenoid assembly 100 is configured to act as a valve to control a fluid flow. A housing 102 defines a main body of the solenoid assembly 100. The housing 102 houses the majority of the parts of the solenoid assembly 100, as will be described below in further detail. The parts of the solenoid assembly 100 housed in the housing 102 are, inter alia, a frame 104, coil 106, plunger 108, and guide 109. Other structures are also present in the housing 102, as will be apparent to one skilled in the art.

The coil 106 is a winding of a conductor that has an electrical connection 112 attached thereto. The coil 106 is connected to a power source (not shown) for operating the solenoid assembly 100. When a current is applied to the coil 106 via the electrical connection 112, a magnetic field is created that acts upon the plunger 108. The frame 104 is illustrated as a C-frame. The frame 104 is made from a metal, such as iron, and acts as a flux path. The magnetic field produced by the coil 106 is channeled through the frame 104, plunger 108, any air gaps, and the coil 106, completing a flux circuit. A frame 104 made from iron or similarly magnetically permeable substance reduces the magnetic reluctance of the flux path.

A number of seals 110 may be present throughout the solenoid assembly 100 for the purpose of creating and maintaining fluid-tight junctions. A detailed description of their arrangement and composition is beyond the scope of the present description.

Upon energizing the coil 106, the plunger 108 is attracted by the magnetic field, and travels from a first, unactuated, position to a second, actuated, position. The plunger 108 travels inside the guide 109, which is disposed within the coil's core 114. The core 114 is typically defined by a bobbin (not shown) that is made from plastic or another non-magnetic material, upon which the coil's conductor is wound. Once power is removed from the coil 106, the plunger 108 returns to the unactuated positon. This may be due to orientation of the solenoid, an external force acting on the plunger 108, or from a biasing member 116, such as a spring, as in the present example. In the example illustrated, when the plunger 108 moves to an actuated position (upward in FIG. 1) due to the energizing of the coil 106, a valve seal 118 attached to the plunger 108 disengages from a valve seat 122 disposed on a valve body 120. This allows a first fluid passage 124 to come into fluid communication with a second fluid passage 126. Conversely, when the coil 106 is not receiving a current, the biasing member 116 on the plunger 108 forces the plunger 108 into the unactuated position (downward in FIG. 1), so the valve seal 118 returns to contact the valve seat 122 and interrupts fluid communication between the first fluid passage 124 and the second fluid passage 126. In an embodiment, a fly nut 119 engages the valve body 120 and also an object to which the solenoid assembly 100 is attached, such as a manifold, for example without limitation.

Should the solenoid assembly 100 need to be serviced, at least a partial disassembly is required. In order to disassemble the solenoid assembly 100, a user would need to grasp the housing 102. Unfortunately, due to the cylindrical nature of the internal components, structures such as the frame 104, coil 106, and guide 109 are prone to rotation upon application of torque to the housing 102. Should a potting material be present in the housing for protection against the elements, the independent rotation of internal components induced from applying a torque to the housing 102 may easily compromise the integrity of the potting, and thus compromise overall environmental sealing.

Figure 2:
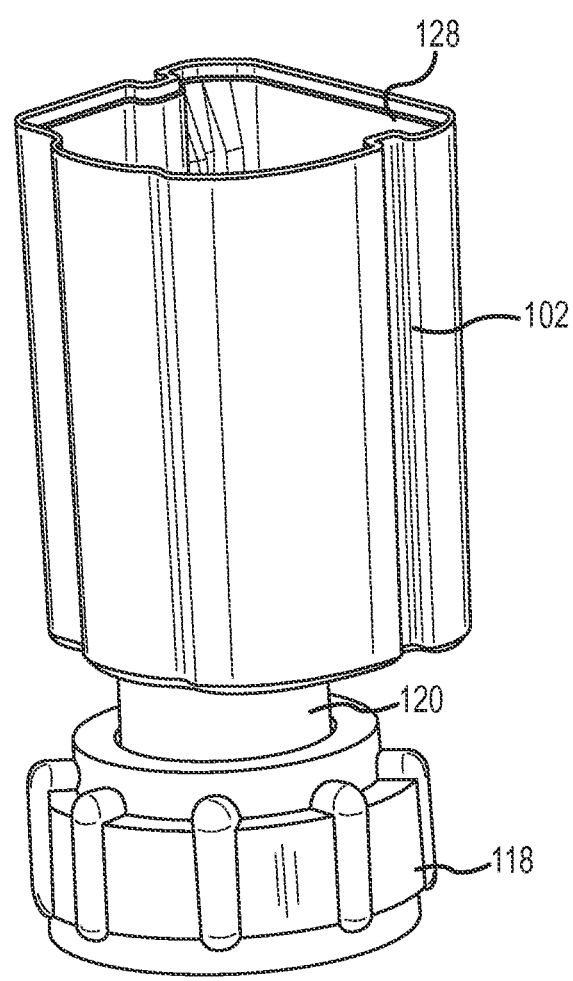
FIG. 2 illustrates an isometric view of a solenoid assembly according to an embodiment.
Figure 3:
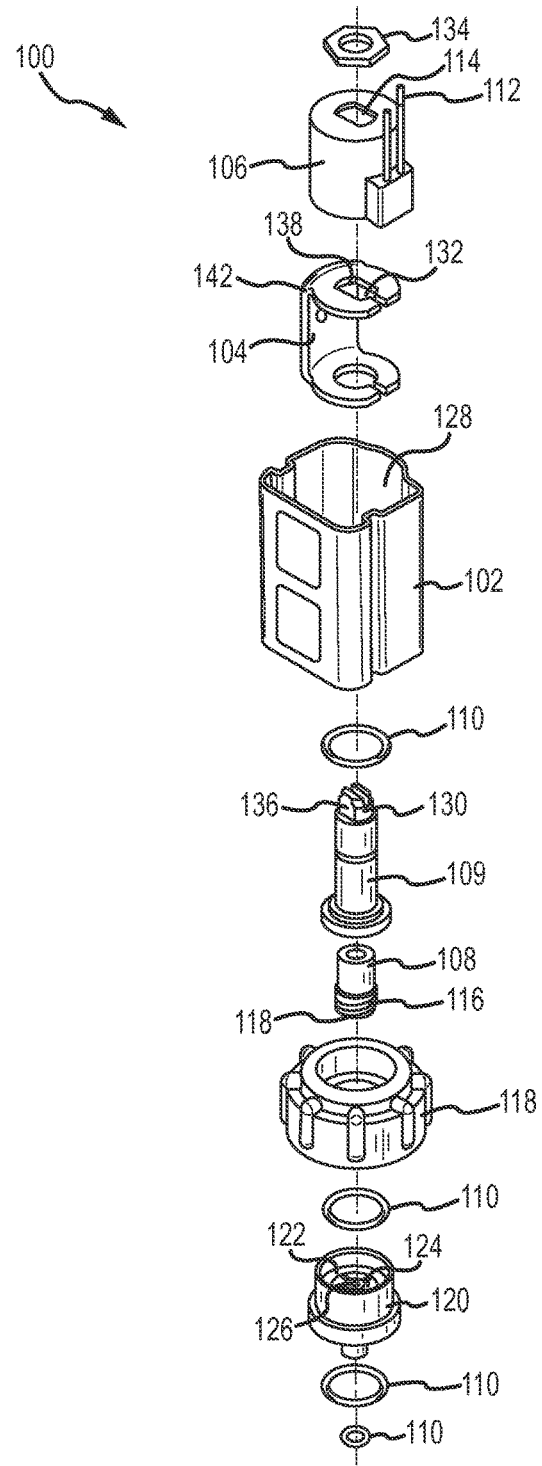
FIG. 3 illustrates an exploded view of a solenoid assembly according to an embodiment.

Turning to FIGS. 2 and 3, a solenoid assembly 100 according to an embodiment is illustrated. Common elements with the prior art solenoid assembly 100 of FIG. 1 are designated by common numbering. In the embodiment illustrated, the solenoid assembly 100 is configured as a valve. Other embodiments of solenoids are also contemplated that are not valves. In an embodiment, the solenoid assembly 100 is fluid tight. The housing 102 is made from a fluid resistant material, such as a metal, plastic, polymer, composite, ceramic, combinations thereof, or any other material known in the art. The coil 106 is cradled by the frame 104, and positioned inside a cavity 128 defined by the housing 102. In an embodiment, the frame 104 is an open type, such as a C-frame (illustrated) or D-frame. Tubular frame construction is also contemplated. The guide 109 is positioned to pass through the coil's core 114. A threaded portion 130 of the guide 109 passes through an aperture 132 defined by the frame 104. A fastener 134 engages the threaded portion 130 to secure the guide 109 to the frame 104. It should be noted that the threaded portion 130 is securable to the frame 104 in any manner known in the art, and this may even include means without threads, such as by detent, cotter pin, or any other fastener.

To facilitate environmental sealing, components encapsulated by the housing 102 are coated. The coating may comprise any potting material known in the art. The potting may be a solid or gelatinous compound that provides shock resistance and also excludes moisture, fluids, particulate matter, and corrosive agents. In an embodiment, the potting may be a thermo-setting plastic, silicone, or epoxy. However, any potting material known in the art is contemplated.

When the solenoid assembly 100 is disassembled for service, a user may grasp the housing 102 and apply a torque. An embodiment of the assembly 100 prevent structures, such as the frame 104, coil 106, and guide 109, for example without limitation, from rotating independently. In an embodiment, the housing 102 and frame 104 rotate coincidentally. In an embodiment, the housing 102 and guide 109 rotate coincidentally. In an embodiment, the housing 102 and coil 106 rotate coincidentally. In an embodiment, the frame 104 and guide 109 rotate coincidentally. In an embodiment, the frame 104 and coil 106 rotate coincidentally. In an embodiment, the coil 106 and guide 109 rotate coincidentally. Additionally, the integrity of the potting material present in the housing is not compromised due to the rotation induced from applying a torque to the housing 102. Therefore, the act of disassembling the solenoid assembly 100 does not compromise the environmental sealing.

Figure 4:
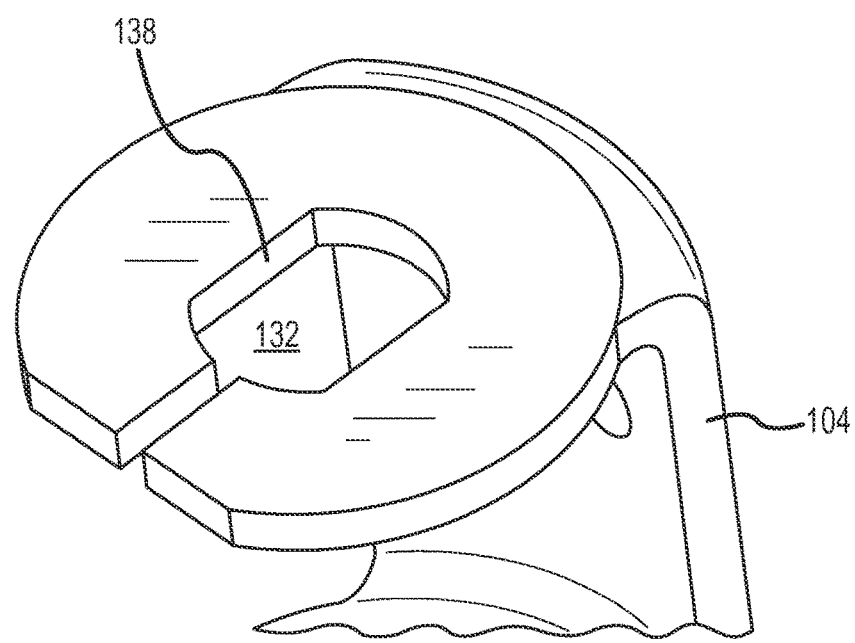
FIG. 4 illustrates an isometric view of a portion of a frame according to an embodiment.
Figure 5:
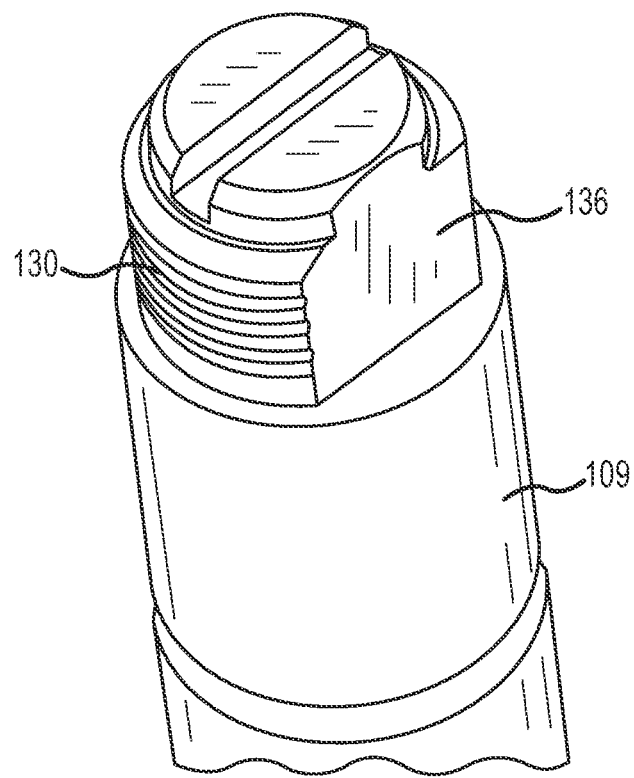
FIG. 5 illustrates an isometric view of a portion of a guide according to an embodiment.
Figure 6:
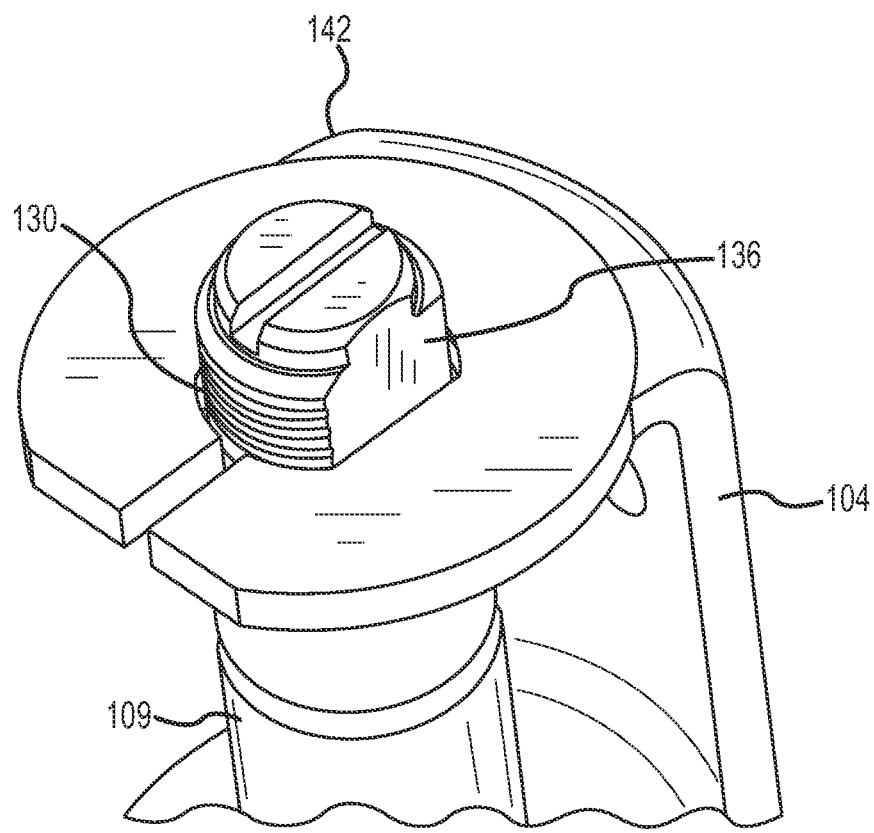
FIG. 6 illustrates an isometric view of a portion of the guide and frame of FIGS. 4 and 5.

Turning to FIGS. 4-6, the frame 104, in an embodiment, has an aperture 132 that is a size and dimension such that it is keyed to a mating portion 136 of the guide 109. In the embodiment illustrated, the mating portion 136 is defined by two parallel flat portions formed with the guide 109. These flat portions may pass through the aperture 132 that is keyed the mating surface 138 defined by the frame 104. Due to the flat nature of the mating portion 136 and the mating surface 138, a guide 109 that is inserted into the aperture 132 is not able to spin within the aperture 132. Although the embodiment illustrated shows two flat areas on mating regions 136, 138, embodiments contemplated include only a single flat mating portion 136, square, star, triangular, polygonal, keywayed, or any other shape known in the art that prevents the guide 109 from spinning within the aperture 132 upon torque application. Since the guide 109 can't spin within the aperture 132, when a torque is applied to the frame 104, that same torque is transferred to the guide 109. In an embodiment, the threaded region 130 passes through the aperture 132, leaving a sufficient number of threads for a fastener 134 to engage the threaded region 130 and secure the guide 109 to the frame 104.

Turning back to FIG. 3, the coil 106, in an embodiment, has an aperture 133 that is a size and dimension such that it is keyed to the mating portion 136 of the guide 109. Due to the flat nature of the mating portion 136 and the mating shape of the aperture 133, the guide 109, when inserted into the aperture 133, is not able to rotate within the aperture 133. Although the embodiment illustrated shows two flat areas on the mating portion 136, embodiments contemplated include only a single flat mating portion 136 (and compatible aperture 133 shape and dimension), square, star, triangular, polygonal, keywayed, or any other shape known in the art that prevents the guide 109 from spinning within the aperture 133 upon torque application. Since the guide 109 can't independently spin within the aperture 133, when a torque is applied to the coil 106, that same torque is transferred to the guide 109. In an embodiment, the threaded region 130 passes through the aperture 133, leaving a sufficient number of threads for a fastener 134 to engage the threaded region 130 and secure the guide 109 to the frame 104 and/or coil 106.

Figure 7:
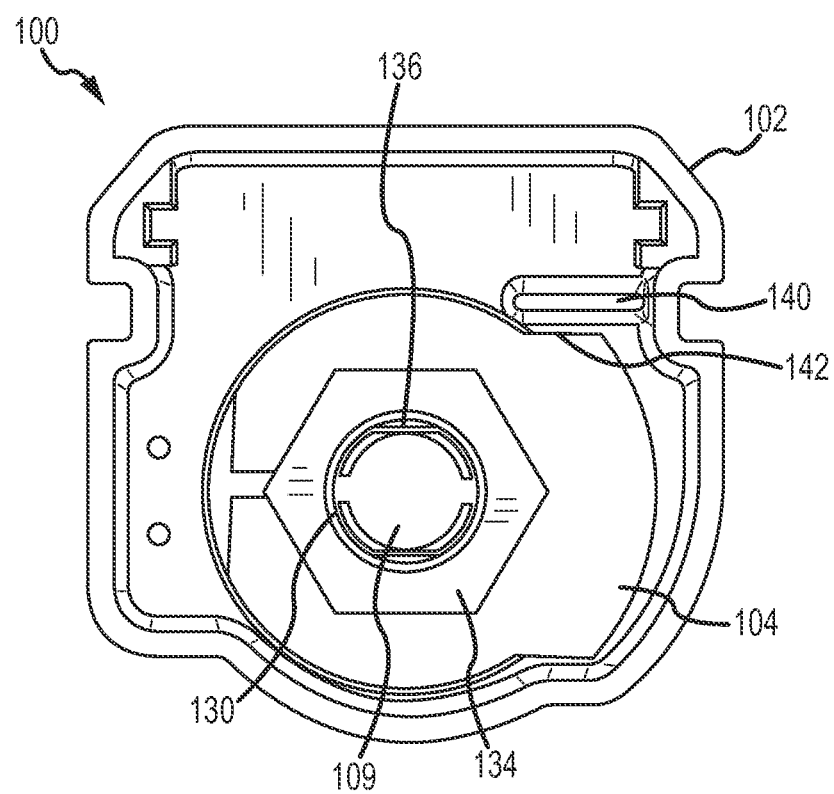
FIG. 7 illustrates a top view of a solenoid assembly according to an embodiment.

In FIG. 7, a top view of the solenoid assembly 100 is illustrated in a partially assembled state. The housing 102 has a detent 140 in the embodiment illustrated. The detent 140 engages a stop 142 defined by the frame 104 that prevents the frame 104 from rotating independently from the housing 102. In an embodiment, the detent is molded with the housing 102. In another embodiment, the detent 140 is a piece of material installed in the housing 102. In an embodiment, there is no detent 104 or stop 142, but rather the housing 102 is shaped such that the frame 104 has a complimentary shape to fit within the housing, so the frame 104 is captured by the housing 102 in a manner that prevents independent rotation of the frame 104 within the housing 102. It should be noted that the stop 142 may be located on a member that transfers an external torque to the solenoid assembly's 100 internal structures that resembles at least a portion of the frame 104, yet does not serve as a flux path.

In an embodiment, potting is placed in the housing 102 cavity 128, and adheres the frame 104 to the housing 102. Because the detent 140 engages the stop 142 on the frame 104, when the housing is rotated 102, the frame 104 is also rotated, and the stress on the potting is minimized. When a user grasps the housing 102 during disassembly and applies a torque thereto, that torque is transferred via the detent 140 to the stop 142 on the frame 104. The frame 104, in turn, transfers this torque via the mating surfaces 138 of the frame 104 to the mating portion 136 of the guide 109. Therefore, the rotation of the housing 102 and internal components is coincident. Therefore, stresses that would ordinarily shear the internal components from potting within the housing 102 are minimized, and the environmental seal created by the potting thus remains intact.

A method of manufacturing a solenoid assembly 100 is also contemplated. In an embodiment, the method of manufacturing the solenoid assembly 100 comprises the step of placing the frame 104 in the housing 102, wherein the frame 104 is prevented from rotating independently of the housing 102. In this embodiment, the housing 102 at least partially houses the coil 106, frame 104, and plunger 108. In a related embodiment, a detent 140 is provided in a cavity 128 defined by the housing 102 that is configured to contact a stop 142 so to prevent the frame 104 from rotating independently of the housing 102. The detent 140 may be a defined by the housing 102. In a related embodiment, the guide 109 is placed through an aperture 132 of the frame 104, and thus the guide 109 is prevented from rotating independently of the frame 104. The step of placing a guide 109 through the aperture 132 may be effectuated by providing a mating portion 142 on the guide and also providing an aperture 132 defined by the frame 104, wherein the aperture 132 is keyed to the mating portion 136 and thus prevents the guide 109 from rotating independently of the frame 104.

A method of disassembling the solenoid assembly 100 is also provided according to an embodiment, and comprises the steps of: applying a torque to the housing 102; transferring the torque from the housing 102 to a frame 104 disposed at least partially in the housing 102; transferring the torque from the frame 104 to the guide 109 via the aperture 132; and removing at least one structure from within the housing 102 without compromising an encapsulation/potting of the housing.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other devices and method, and not just to the embodiments described above and shown in the accompanying figures. Accordingly, the scope of the invention should be determined from the following claims.

What is claimed is:

1. A solenoid assembly (100) comprising:
   a frame (104);
   a coil (106) positioned proximate the frame (104);
   a core (114) defined by the coil (106);
   a plunger (108) actuatable between at least a first position and a second position;
   a guide (109) at least partially disposed within the core (114), and the guide (109) being prevented from rotating independently of the frame (104), wherein the plunger (108) is disposed at least partially within the guide (109); and
   a housing (102) that at least partially houses the frame (104), the coil (106), the guide (109) and the plunger (108), wherein the guide (109) is prevented from rotating independently of the housing (102), wherein the solenoid assembly (100) further comprises:
   a flat mating portion (136) defined in a threaded region (130) of the guide (109); and
   an aperture (132) defined by the frame (104), wherein the aperture (132) has a mating surface (108) which is configured to receive the flat mating portion (136) of the threaded region (130) of the guide (109) and is configured to prevent the guide (109) from independently rotating within the aperture (132) of the frame (104) by engaging the flat mating portion (136) with the mating surface (108).

2. The solenoid assembly (100) of claim 1, wherein the plunger (108) is operable with a valve body (120) and configured to control a fluid flow.

3. The solenoid assembly (100) of claim 1, wherein the frame (104) is prevented from rotating independently of the housing (102).

4. The solenoid assembly (100) of claim 3, comprising:
a stop (142) defined by the frame (104); and
a detent (140) within the housing (102) configured to contact the stop (142), wherein the detent (140) is configured to prevent the frame (104) from rotating independently of the housing (102).

5. The solenoid assembly (100) of claim 3, wherein the housing (102) is shaped to trap at least a portion of the frame (104) to prevent independent rotation of the frame (104).

6. The solenoid assembly (100) of claim 4, wherein the detent (140) is defined by the housing (102).

7. The solenoid assembly (100) of claim 1, wherein the frame (104) defines at least a portion of a flux path.

8. The solenoid assembly (100) of claim 1, comprising:
a potting disposed inside the housing (102) that encapsulates at least a portion of structures disposed within the housing (102).

9. The solenoid assembly (100) of claim 8, wherein the potting is an epoxy.

10. The solenoid assembly (100) of claim 1, wherein the guide (109) is prevented from rotating independently of the coil (106).

11. The solenoid assembly (100) of claim 10, comprising:
a mating portion (136) defined by the guide (109); and
an aperture (133) defined by the coil (106), wherein the aperture (133) is configured to receive the mating portion (136) and is configured to prevent the guide (109) from independently rotating within the aperture (133).

12. A method of manufacturing a solenoid assembly having a housing that at least partially houses a coil, a frame, a guide, and a plunger, comprising the step of placing the guide in the housing, wherein the guide is prevented from rotating independently of the housing and the frame and wherein the solenoid assembly further comprises:
a flat mating portion (136) defined in a threaded region of the guide (109);
providing an aperture defined by the frame (104); and
placing the guide through the aperture of the frame, wherein the guide is prevented from rotating independently of the frame, and wherein the aperture is configured to receive the flat mating portion of the threaded region (130) of the guide (109) and is configured to prevent the guide (109) from independently rotating within the aperture (132) of the frame (104) by engaging the flat mating portion (136) with the mating surface (108).

13. The method of manufacturing a solenoid assembly of claim 12, comprising the step of placing the frame in the housing, wherein the frame is prevented from rotating independently of the housing.

14. The method of manufacturing a solenoid assembly of claim 13, comprising the step of providing a detent in a cavity defined by the housing that is configured to contact a stop on the frame, wherein the detent prevents the frame from rotating independently of the housing.

15. The method of manufacturing a solenoid assembly of claim 14, wherein the step of providing a detent comprises the step of forming the detent with the housing.

16. The method of manufacturing a solenoid assembly of claim 12, comprising the step of placing a potting in the housing.

17. The method of manufacturing a solenoid assembly of claim 12, comprising the steps of:
providing an aperture defined by the coil;
placing the guide through an aperture of the coil, wherein the guide is prevented from rotating independently of the coil.

18. The method of manufacturing a solenoid assembly of claim 17, wherein the step of placing a guide through an aperture of the coil comprises the step of providing a mating portion on the guide.

19. A method of disassembling the solenoid assembly of claim 1 comprising the steps of:
applying a torque to a housing;
transferring the torque from the housing to a guide disposed at least partially in the housing, wherein the guide and housing are configured to rotate coincidentally; and
removing at least one structure from the housing without compromising an encapsulation of the housing.

20. The method of disassembling a solenoid assembly of claim 19, comprising the step of transferring the torque from the housing to a frame disposed at least partially within the housing, wherein the frame and housing are configured to rotate coincidentally.

21. The method of disassembling a solenoid assembly of claim 20, comprising the step of transferring the torque from the frame to a coil disposed at least partially within the housing, wherein the frame and coil are configured to rotate coincidentally.

22. The method of disassembling a solenoid assembly of claim 20, comprising the step of transferring the torque from the frame to the guide, wherein the frame and guide are configured to rotate coincidentally.

23. The method of disassembling a solenoid assembly of claim 19, comprising the step of transferring the torque from the housing to a coil disposed at least partially within the housing, wherein the housing and coil are configured to rotate coincidentally.

24. The method of disassembling a solenoid assembly of claim 23, comprising the step of transferring the torque from the coil to the guide, wherein the coil and guide are configured to rotate coincidentally.

25. The method of disassembling a solenoid assembly of claim 19, comprising the step of providing a potting within the housing to form the encapsulation.

* * * * *